United States Patent [19]

Meier

[11] 4,248,713
[45] Feb. 3, 1981

[54] FILTRATION PLANT

[75] Inventor: Josef Meier, Engelburg, Switzerland

[73] Assignee: Filtrox Maschinenbau A.G., Engelburg, Switzerland

[21] Appl. No.: 954,106

[22] Filed: Oct. 24, 1978

[30] Foreign Application Priority Data

Nov. 12, 1977 [CH] Switzerland ............... 13773/77

[51] Int. Cl.² ............................................. B01D 35/00
[52] U.S. Cl. ...................................... 210/232; 210/341; 210/323.2
[58] Field of Search .................. 210/79, 81, 82, 97, 210/106, 108, 117, 120, 136, 137, 322, 323 T, 332, 333 R, 333 A, 353, 391, 392, 393, 420, 425, 427, 430, 431, 432, 435, 436, 472, 232, 340, 341

[56] References Cited

U.S. PATENT DOCUMENTS 3,045,826  7/1962  Howard et al. ................. 210/323 T Primary Examiner—Frank Sever
Attorney, Agent, or Firm—William J. Daniel

[57] ABSTRACT

A candle filtration unit of the type having a filter vessel, a wall plate disposed within the vessel and dividing its interior into a lower feed section and an upper discharge section, a plurality of filter candles suspended from the wall plate, a sediment receptacle connected to the lower feed section via shut-off means, and means for supplying cleaning liquid to the upper section to create a backflow through the unit to remove sediment deposited on the filter candle, is provided with accumulating means associated with the upper end of each filter candle to prevent the flow of cleaning liquid into the candles until an adequate quantity of liquid has accumulated in the discharge section and a predetermined pressure differential between the pressure in the discharge section and the pressure in the feed section is achieved.

14 Claims, 1 Drawing Figure

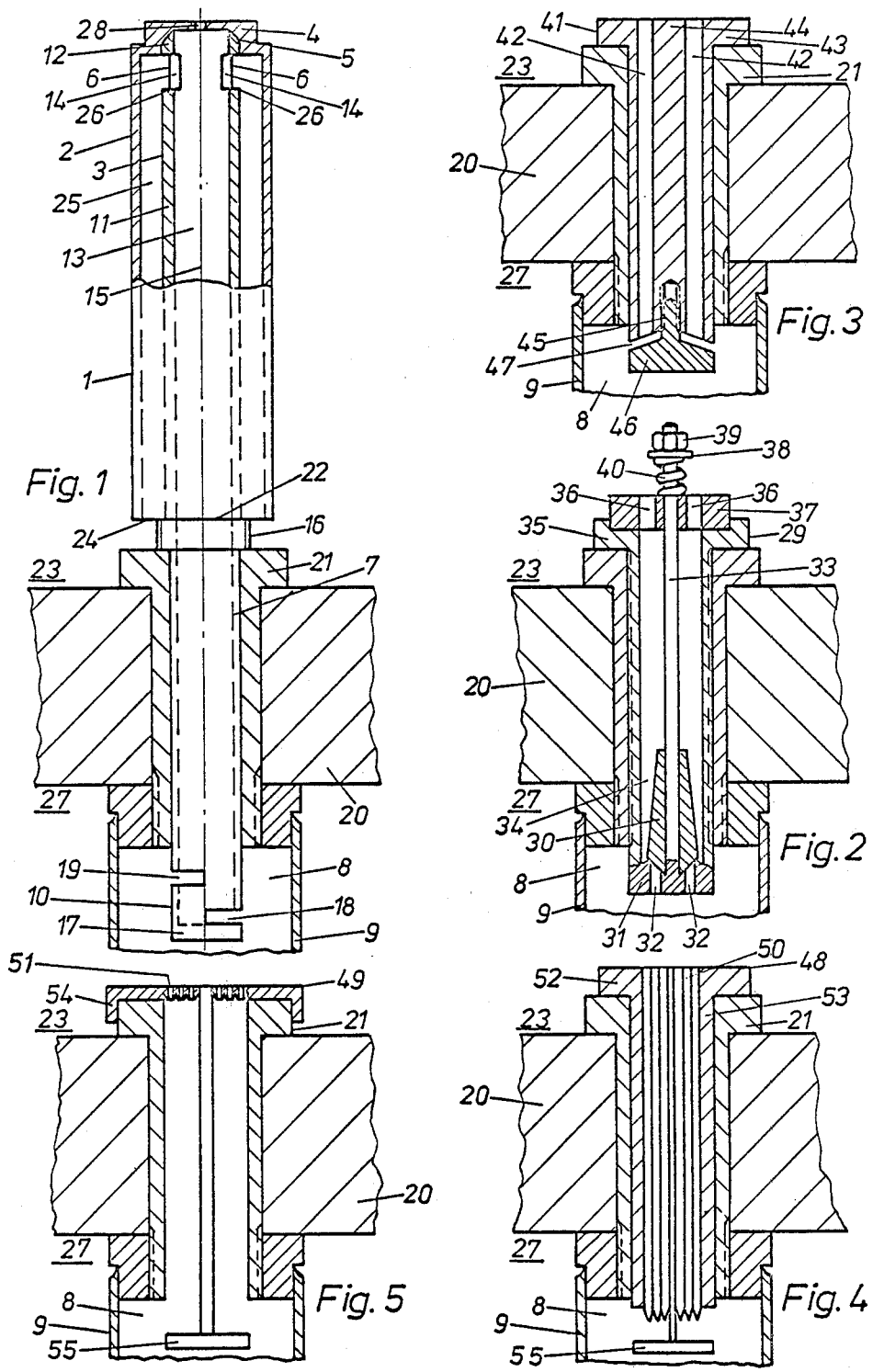

FILTRATION PLANT

The invention relates to a filtering plant having a candle filter comprising a filter vessel, pendantly fitted filter candles and a wall panel carrying the filter candles and disposed between a lower feed section and an upper discharge section of the vessel interior, and a sediment receptacle connected to the discharge side of the vessel interior via a shut-off valve.

A filtration plant of this type is known for example from Swiss Pat. No. 481 669. With such a filtering plant, and applying the backwash cleansing method described in that patent, it is possible to discharge the sediment separated from the filter candles during the backwash cleansing process in the form of a pulp or mud containing only relatively little liquid, this is not possible with conventional filtering plants using candle filters due to the lack of a container which is connected to the discharge side of the filter vessel interior via a shut-off valve. Discharge of the sediment in pulp or mud form has, in contrast to discharge in form of a sediment-water suspension with a quantity of water roughly corresponding to the contents of the filter vessel, which is inevitable in the case of the conventional filtering plants, the advantage that subsequent decantation of the water and the resultant expenses for equipping and maintaining a decantation plant, are unnecessary when the sediment is discharged in pulp form. In this connection, it might also be mentioned that the direct diversion of sediment-water suspension into the sewer system, hitherto conventional in avoiding this expense, is nowadays no longer permitted on grounds of environmental protection and in any case, it would produce no saving on costs because then, for introducing the sediment-water suspension into the used water network, it would, according to the consumer principle, mean that corresponding fees or taxes would have to be paid to the applicable local authorities for sewage purification, and which are as a rule even higher than the expense involved in equipping and maintaining a decantation plant.

Discharge of the sediment in mud form by means of the backwash cleansing method described in the above patent for filtering plants of the type described is in principle achieved in that, upon completion of the filtration, the filter vessel is first emptied by compressed air applied to the feed side of the vessel interior while a pressure gradient preventing premature drop of the sediment cake from the filter candles is maintained from the feed side to the discharge side of the vessel interior and then, after the shut-off valve has been opened between the discharge section of the vessel interior and the sediment receptacle by means of a gaseous medium which is normally present in this container under superatmospheric pressure and which is formed by compressed air, a cleansing liquid normally consisting of water is passed into the filter candles distributed over the inside walls of the candles and forced by the subsequent pressurised gas through the walls of the candles so that the sediment cake is detached from the filter candles and falls into a funnel constituting the bottom of the filter candle, where the sediment, after being thoroughly mixed with the cleaning liquid which has been forced through the filter candles by the compressed air can be forced out of the vessel and thus discharged in pulp form. Over long years of practical experience, this method has proved very successful but it was noted that the capacity of the candle filter unit was increased, the quantity of cleaning liquid required increased to a greater extent than would have been expected according to the increased number of filter candles to match the size of the unit. Such an over-proportional increase in the necessary quantity of cleaning liquid with increasing number of filter candles is undesirable because it naturally also means an increase in the percentage water content of the discharged sediment pulp and the volume of sediment pulp per filter candle.

Therefore, the invention was based on the problem of providing a filtering plant of the type mentioned at the outset, in which the quantity of cleaning liquid necessary per filter candle is substantially independent of the capacity of the candle filter unit.

According to the invention, in the case of a filtering plant of the type mentioned at the outset, this is achieved in that at their top ends, the filter candles are each provided with accumulating means which when the pressure is the same as or lower in the upper as in the lower section of the vessel interior, is effective to accumulate liquid above the wall panel while when the pressure in the upper section exceeds that in the lower section of the vessel interior a discharge of accumulated liquid to be discharged into the interior of the filter candle.

The advantage of these damming means is that the cleaning liqiud prior to be delivered into the individual filter candles is collected above the wall panel so that an at least approximately even distribution of cleaning fluid over the individual filter candles results and this in turn, with suitable selection of the overall quantity of cleaning fluid involved, means that just the right quantity of cleaning fluid needed to detach the sediment is fed to each individual filter candle. Since, furthermore, such a regular distribution occurs whatever the size of the candle filter unit, it is thus possible for the quantity of cleaning liquid per filter candle to be maintained constant virtually regardless of the size of the candle filter unit. Thus, finally, there is the advantage of the discharged sediment containing a minimal quantity of liquid which is the same for candle filters of any desired size, and also that the quantity of sediment pulp per filter candle is independent of the size of the candle filter.

In the case of a preferred embodiment of the present filter plant, the accumulating means comprises a feed aperture which discharges into the discharge part of the vessel interior for feeding the accumulated liquid, a discharge orifice communicating with the interior of the associated filter candle and a communicating duct between feed aperture and discharge orifice, which extends via an overflow point which is higher up than the mouth of the feed aperture. The mouth of the feed aperture may thereby be expediently situated in the region of the wall panel and the overflow point at a height from the wall panel which corresponds to maximum height of accumulation.

In the case of this preferred embodiment, it is advantageous for the damming means to comprise two concentric vertically disposed tubes of which the outer is open at its bottom end and closed with a cover at its top end while the inner tube is at its top end connected to this cover and is provided with apertures below this connecting point and at its bottom end is connected to a spray nozzle which extends into the interior of the candle, the bottom end of the inner tube forming the discharge orifice and the annular face between the bottom ends of the inner and of the outer tubes constituting the feed aperture of the damming means and the communicating passage between feed aperture and discharge orifice extending from the annular face in the intermediate space between the two tubes upwardly and then via the said apertures into the inner tube and thence downwards to the bottom end of the inner tube. Ideally, the cover is thereby, in order to avoid a siphoning effect from the damming means is, provided with a hole, the cross-section of which is less than 10% and preferably less than 5% the cross-section of the opening in the inner tube. The holes at the upper end of the inner tube can advantageously be U-shaped slots, the arms of the U-shape extending in the peripheral direction of the tube and the tongues enclosed by the U-shape being bent towards the interior of the tube to act as baffles for the liquid which flows through the holes towards the interior of the tube.

In the case of a further advantageous embodiment of the present filtering plant, the damming means is located in the flow from the upper section of the vessel to the interior of the associated filter candle and allows the throughflow of liquid in the direction of flow from the upper section of the vessel to the candle interior only when a definite threshold value of the pressure differece exists between the pressure in the upper part of the vessel interior and the pressure in the candle interior and in the opposite direction of flow only when there is an over-pressure in the candle interior in comparison with the upper part of the vessel interior.

In the case of this further embodiment of the present filtering plant, the damming means may advantageously comprise two anti-parallel over-pressure valves, one of which is intended for the throughflow in the direction of flow from the upper section of the vessel and is pretensioned corresponding to the predetermined threshold value of the pressure differential while the other serves for the throughflow of liquid in the opposite direction.

In the case of another alternative embodiment which entails particularly minimal technical complication, the constriction comprises at least one communicating passage located in the path of flow from the upper section of the vessel to the candle interior and the inside diameter of which is so dimensioned that the capillarity of the communicating passage prevents the formation of air bubbles rising in a column of liquid in the communicating passage so that the column of liquid can therefore be supported in the communicating passage by air located below it. In the case of this alternative embodiment, it is advantageous for a plurality of identically constructed communicating passages, preferably a plurality of cylindrical communicating passages of the same diameter to be provided and to be disposed at the same height and connected for parallel flow.

In the case of a further alternative embodiment of the invention which likewise entails relatively minimal technical complication, the constriction comprises a plurality of communicating passages disposed in the path of flow from the upper section of the vessel to the candle interior, located at the same height and connected for parallel flow and of approximately the same inside diameter at least in the region of their openings toward the candle interior side, these openings being so constructed and their inside diameters in the region of these openings being so dimensioned that the amount of curvature itself excludes the possibility of liquid-air boundary faces forming at these openings and also, in conjunction with a pressure differential between the pressure in the interior of the candle and the pressure in the upper part of the vessel interior, excludes the possibility of drops becoming detached from these openings. The communicating passages may thereby expediently be of slot shape and, at least in the region of their candle interior-end apertures, have an inside diameter of less than 2 mm and preferably of between 0.1 and 0.5 mm. Also an embodiment in which the communicating passages have at least in the region of their candle interior openings, a circular cross-section with a diameter of less than 4 mm and preferably between 0.2 and 1 mm, has been found to be very convenient. It is furthermore of advantage if the walls defining the communicating passages have, at the openings towards the interior of the candles, sharp edges with an angle of between 0 and 60° between the inside and outside of the wall, and a radius of curvature of less than 0.1 mm and preferably less than 0.05 mm.

The invention is explained in greater detail hereinafter with reference to exemplary embodiment of the damming means for the present filtering plant, reference being made therein to the accompanying drawings, in which:

FIG. 1 shows an example of one embodiment of damming means of the above-mentioned preferred embodiment of the present filtering plant in the incorporated state, with the upper end of the associated filter candle and that zone of the wall panel where the damming means and the associated filter candle are mounted;

FIG. 2 shows an example of an embodiment of a damming means of the aforesaid further advantageous embodiment of the present filtering plant, with two anti-parallel connected over-pressure valves, likewise in the installed condition, with the upper end of the associated filter candle and the zone of the wall panel in which constriction and filter candle are mounted;

FIG. 3 shows another example of embodiment of a damming means in the above-mentioned further advantageous embodiment of the present filtering plant, with a plurality of parallel communicating passages leading to the interior of the candle, in each of which it is possible for a liquid column to be supported by air located below it without the formation of air bubbles rising through the communicating passage, and FIGS. 4 & 5 each show a further example of embodiment of a damming means in the aforementioned further advantageous development of the present filtering plant with several parallel communicating passages leading to the interior of the candle, the candle interior end openings of which, for suitable pressure conditions, exclude the possibility of any drips becoming detached.

The damming means 1 shown in FIG. 1 consists essentially of two vertically disposed concentric tubes 2 and 3, of which the outer tube 2 is open at its bottom end is closed at its top end with a cover 4 while the inner tube 3 is connected to this cover 4 at its top end and, below this connection point 5, is provided with apertures 6. At its bottom end it is connected in one piece to a spray nozzle 10 constituted by an extension 7 of the inner tube 3 and extending into the interior 8 of the associated filter candle 9. The part 11 of the inner tube 3 which extends upwardly to the apertures 6 constitutes the actual damming means, its upper end 12 forming a support for the bell cover which is constituted by the outer tube 2 with cover 4 and which is slipped over the constricting tube. The apertures 6 below the top end 12 of the inner tube 3 are U-shaped slots with the arms of the U-shape extending in the peripheral direction of the tube 3 and having, bent in towards the tube interior 13 and framed by the U-shape, tongues 14 which act as baffles for liquid flowing into the interior 13 of the tube through the apertures 6, imparting a twist about the tube axis 15 to the liquid which then flows downwards inside the tube 13. At its bottom end, the inner tube 3 has a flange 16 adjacent to the underside of which is the extension 7 of the inner tube 3. The extension 7 extends into the interior 8 of the filter candle 9 associated with the damming means 1 and is closed at its bottom end by a bottom 17 and has in the region of its portion which protrudes into the candle interior 8, two transverse slots 18 and 19. In conjunction with these two transverse slots 18 and 19, the extension 7 forms the spray jet which serves to provide the above-mentioned distribution of cleaning fluid over the inside walls of the candles. The extension 7 has an external screwthread and is screwed into the hollow screw 21 which serves to hold the filter candle 9 on the wall plate 20. Alternatively, the extension 7 may have on its outside a smooth cylindrical surface and may be merely fitted into the hollow screw 21. The flange 16 is provided with two oppositely disposed flattened faces which serve as faces to which can be applied a tool for loosening the screwed joint between the extension 7 and the hollow screw 21.

In the case of the damming means shown in FIG. 1, the bottom end of the inner tube 3 which is located at the transition from the inner tube 3 to the flange 16 forms the discharge orifice 22 of the constriction 1 which communicates with the interior 8 of the associated filter candle 9 via the spray jet 10 while the annular face between the bottom end of the inner tube 3 and the bottom end of the outer tube 2 forms a feed aperture 24 of the damming means 1 for the passage of accumulated liquid into the discharge section of the vessel. The apertures 6 connecting the intermediate space 25 between the two tubes 2, 3 to the tube interior 13 of the inner tube 3, below the bottom end 12 of the inner tube 3, define the overflow point 26 which determines the maximum height of accumulation within the damming means 1. The discharge of accumulated liquid via the damming means 1 occurs via the connecting passage extending from the feed aperture 24 in the intermediate space 25 between the two tubes 2, 3 upwards and via the apertures 6 into the inner tube 3 and thence downwards to the bottom end of the inner tube 3.

The mode of action of the damming means 1 shown in FIG. 1 is as follows: upon completion of filtration, after the interior of the vessel has been emptied by a supply of compressed air to the feed side part 27 of the vessel interior and once a cleaning liquid and compressed air have been stored in the aforesaid container connected via a non-return valve to the discharge side part 23 of the vessel interior, firstly, once the shut-off valve has been opened, the cleaning fluid is passed by the compressed air from the container into the discharge section 23 of the vessel interior which is connected to the container via the opened shut-off valve, and by virtue of the horizontal location of the wall plate 20, becomes distributed substantially evenly over the entire wall plate 20, since a discharge of the cleaning fluid into the candle interiors 8 of the filter candles 9 suspended from the wall plate 20 is presented by the damming means 1 associated therewith. With the further feed of cleaning liquid from the container, the level of liquid accumulating above the wall plate 20 rises above the feed apertures 24 of the constrictions 1 and at the same time the air pressure in the discharge section 23 of the vessel rises according to the volume $V_F$ displaced by the cleaning liquid supplied, and in fact in proportion to the ratio of the total volume V of the discharge section 23 of the vessel to the residual volume $(V-V_F)$ available for the air and not filled by the cleaning liquid supplied. Since this rise in air pressure amounts as a rule to just a few tenths of an atmosphere and extends over the entire duration of the supply of cleaning liquid from the said container to the discharge side part 23 of the vessel interior, the rise in air pressure per unit of time is, during this feeding of cleaning liquid, still low enough to permit of constant pressure equalization via the hole 28 in the cover 4 of the outer tube 2 of the constriction 1, so that the level of the cleaning liquid, despite the rise in air pressure in the discharge side part 23 of the vessel interior and in the intermediate space 25 between the two tubes 2, 3 rises to approximately the same extent during the feeding of cleaning liquid from the said container to the discharge side part 23 of the vessel interior. Only when such feed is completed and the compressed air from the said container flows into the discharge section 23 of the vessel does the air pressure there rise so rapidly that a sufficiently rapid equalization of pressures via the hole 28 is no longer possible and therefore the cleaning liquid in the discharge side part 23 of the vessel interior is forced downwardly and in the intermediate space 25 between the two tubes 2, 3, upwardly, and then through the apertures 6 into the interior 13 of the inner tube 3 and thence, with a twist brought about by the tongues 14 about the axis of the tube 15, downwardly through the extension 7 to the slots 18 and 19, after which it is sprayed in a more or less horizontal direction onto the inner wall of the filter candle 9 then running down the inside wall of the candle. The further rising air pressure in the discharge side part 23 of the vessel interior, brought about by the supply of compressed air from the said container, ensures that the cleaning liquid still present in the discharge section 23 of the vessel interior continues to flow through the damming means 1 of all filter candles 9 of the candle filter into the candle interiors 8 of the filter candles 9 where it is sprayed against the inner walls of the candles unit the level of cleaning liquid in the discharge side part 23 of the vessel interior has dropped to a level somewhat below the feed apertures 24 of the constrictions 1 and compressed air flows through the damming means 1 into the interiors 8 of the filter candles 9. The cleaning liquid which runs constantly down the inner wall of the candle at this point forms a closed film of liquid which is then forced by the inflowing compressed air through the candle wall, leading to a separation from the candle wall of the sludge cake or sediment which has so far collected on the outer wall of the candle and a subsequent sliding down of the sludge cake to the bottom of the filter vessel. The essential point in the previously described mode of action of the constriction 1 shown in FIG. 1 is the fact that during the period in which the cleaning liquid is flowing from the discharge side part 23 of the vessel interior via the damming means 1 into the individual filter candles 9 of the candle filter, even distribution of the cleaning liquid over the individual filter candles is guaranteed even if the level of cleaning liquid above the wall plate 20 is not the same at all parts of the wall plate 20, for example due to wave formation or due to a jet effect resulting from the compressed air flowing from the said container into the discharge section 23 of the vessel, because the rate of flow of cleaning liquid through the constrictions 1 is determined by the flow resistance thereof (including the flow resistance of the extensions 7 and of the slots 18 and 19), and the pressure exerted on the cleaning liquid by the compressed air in the discharge side part 23 of the vessel interior (or more precisely the pressure difference between space 23 and candle interiors 8), and this pressure on the cleaning liquid is the same everywhere in the discharge side part 23 of te vessel interior, just as the constrictions 1 and therefore their flow resistances, are identical in all filter candles 9 of the candle filter. In this connection, it should also be noted that due to the form of the apertures 6 with the tongues 14 which impart to the throughflowing liquid a twist about the tube axis, 15, the creation of roll eddies at the point of reversal of the liquid in the damming means 1 is prevented and therefore the fluctuations in effective flow resistance which may be caused by such roll eddies, and differences between the flow resistances of the individual damming means based on the same cause are avoided. By virtue of this influence of the shape of the apertures 6 with tongues 14, care must also be taken when producing the damming means 1 that no differences arise between the individual means and that correspondingly accurate tolerances are maintained. With regard to the abovementioned automatically resulting even distribution of cleaning liquid over the individaul filter candles, it should finally be pointed out that the surface of the cleaning liquid in the discharge side part 23 of the vessel interior, even with incipient wave formation with a falling liquid level smooths out more and more under the effect of the cushion of compressed air above it, so that the surface of the liquid is already smooth when its level has dropped more or less to the level of the feed apertures 24 of the constrictions 1 and an undulating surface of the liquid might well expose some of these feed apertures 24 prematurely to a secondary supply of compressed air. Also with regard to the aforementioned slight rise in air pressure in the discharge side part 23 of the vessel interior during the supply of cleaning fluid from the said container and also with regard to the pressure equalization which occurs during this time via the hole 28 in the cover 4 of the constriction 1, it should also be mentioned that in the feed side part 27 of the vessel interior, during the backwash cleaning process, it would be convenient to maintain a pressure which is somewhat above the final pressure of this slight air pressure rise or the starting level of the subsequent marked air pressure rise which is brought about by the secondary supply of inflowing compressed air, so that the pressure in the candle interior 8 which is also increasing due to the equalization of pressures via the hole 28 during the slight air pressure rise does not become any greater than the outside pressure on the sludge cake which keeps it applied against the candle wall. Thus, an undesirable premature dropping of individual sludge cakes or pieces thereof, which might well interfere with trouble-free sludge discharge by virtue of the pressure loss occurring at places where sludge cakes have so fallen, can be reliably prevented. The maintenance of such a slight over-pressure in the feed side part 27 of the vessel interior presents no problem because the sludge cakes constitute a high resistance to flow and the discharge of air into the candle interiors 8 occurs only very slowly at such low overpressures. The procedure entailed by backwash cleaning, parts of which have been discribed within the framework of the above explanation of the mode of action of the constriction 1 shown in FIG. 1, from those aspects which are linked with the damming means can be also modified in that the cleaning liquid is stored not in the said container but directly in the discharge side pat 23 of the vessel interior. This possibility may be considered especially if the liquid to be filtered is in the final phase of filtration forced out of the filter vessel in inflowing water and the filter vessel accordingly, when filtration ends, contains a liquid which consists for the most part of water. In this case, in fact, the abovementioned emptying of the filter vessel brought about by the supply of compressed air to the feed side section 27 of the vessel and in which of course first the feed side part 27 and then the discharge section 23 of the vessel interior is emptied, can be prematurely completed so that the quantity of liquid needed for cleaning is left in th discharge side part 23 of the vessel interior. Afterwards, the over-pressure of air is extracted first from the discharge side part 23 and then from the feed side part 27 of the vessel interior until the so-called candle water has flowed out of the filter candles. Compared with the discharge side part of the vessel interior, the under-pressure which is briefly created in the candle interiors 8 of the filter candles 9 during the outflow of candle water from the filter candles and which, it there were no pressure equalizing holes 28, would result in the liquid stored in the discharge side part 23 of the vessel interior being drawn into the candle interiors 8, is compensated for via these holes 28. After the overpressure has been drawn off from the vessel interior and after the candle water has been drained off at the end of this stage, the air drain valves are closed again and then the aforesaid shut-off valve is opened and the said container becomes connected to the discharge side part 23 of the vessel interior. In the present case, only compressed air is stored in this container since the cleaning liquid, of course, is already in the discharge side part 23 of vessel interior. Once the shut-off valve has been opened, therefore, the same conditions prevail as in the abovedescribed backwash cleaning procedure in which cleaning liquid is stored in the said container together with compressed air, when the feed of cleaning liquid from the said container to the discharge side part 23 of the vessel interior is completed and the compressed air starts to flow out of the container. For this reason, the further pattern of this alternative method is then the same as already discribed above. The storage or cleaning liquid in the discharge side part 23 of the vessel interior instead of in the said container can naturally also take place if displacement of the liquid to be filtered out of the filter vessel upon completion of filtration were not effected by inflowing water but by the method described in German Offenlegungsschrift 28 03 756, Aug. 17, 1978, by the filter vessel contents being forced back into the unfiltrate feed line of the filtering plant by pressurized gas. In this case, however, at the end of filtration, the filter vessel is first completely emptied, then pressures between the feed side and discharge side of the vessel interior are equalised, in the final phase of which the candle water is drained off, then the pressurized gas is withdrawn from the vessel interior and only then is the quantity of water needed for cleaning fed to the discharge side part 23 of th vessel interior. Then, the said shut-off valve is opened and the flow of compressed gas stored in the said container to the discharge section 23 of the vessel interior can take place, and the rest of the process is the same as already described above. As has been already briefly intimated, within the framework of the above explanation of the mode of action of the damming means 1 shown in FIG. 1, essentially only those points of the backwash cleaning procedure which are connected with the damming means have been dealt with. In all the other points not mentioned in this explanation, the backwash cleaning procedure corresponds entirely with the backwash cleaning procedure already known from Swiss Pat. No. 481 669.

FIG. 2 shows a further example of embodiment of damming means 29 which consists essentially of two anti-parallel connected over-pressure valves, of which one provides passage in the direction of flow from the discharge section 23 of the vessel interior to the candle interior 8 and the other provides passage in the opposite direction of flow. The overpressure valve which allows passage through in the direction of flow from the candle interior 8 to the discharge section 23 of the vessel interior consists of components 30 to 33 of the damming means 29 and serves to let through the filtrate which during the filtering process flows from the candle interior 8 to the discharge side part 23 of the vessel interior and to block the passage apertures 32 during the backwash process. The cone of this over-pressure valve forms the substantially streamlined body of rotation 30 which is disposed for longitudinal displacement on the tie rod 33 and which, when filtrate flows through against the action of gravity, is lifted so exposing the passages 32 so that filtrate is able to flow from the candle interior 8 through the passages 32 past the underside of the raised body of rotation 30 into the interior 34 of the hollow screw 35 and thence via the passages 36 in the support ring 37 into the drain side part 23 of the vessel interior. The valve seat of this filtrate-passing over-pressure valve is, as FIG. 2 shows, so ground into the valve plate 31 (connected to the tie rod 33) of the other over-pressure valve which allows passage in the direction of flow from the discharge side part 23 of the vessel interior to the candle interior 8 that the valve cone formed by the underside of the body of rotation 30, when it is resting on the valve seat, covers the outlets of the apertures 32. If the force of gravity of the body of rotation 30 is not sufficient to ensure reliable closure of this filtrate passing over-pressure valve upon completion of filtration, then a pretensioned compression spring may be provided on the tie rod 33 between the body of rotation 30 and the support ring 37 in order to increase the force which acts downwardly on the body of rotation 30. The force exerted by this compression spring ought however to be kept as small as possible as otherwise the over-pressure of the filtrate in the candle interior 8, required to open the valve, becomes too great. On the other hand, however, care must be taken to see that the aforedescribed over-pressure valve which is provided to allow passage to filtrate closes thoroughly upon completion of filtration and that the body of rotation 30 cannot under any circumstances remain jammed on the tie rod 33. During the backwash cleaning stage, this over-pressure valve remains closed. Therefore, it has no influence on the backwash process. Upon conclusion of the above-mentioned emptying process which follows the completion of filtration, in order words during the backwash cleaning stage, only the other over-pressure valve which provides passage in the direction of flow from the discharge section 23 of the vessel interior to the candle interior 8 acts. This over-pressure valve is formed by components 31 and 33 to 40 of the damming means 29 and in the closed condition serves to build up cleaning liquid in the discharge side part 23 of the vessel interior and, when opened, acts as a spray jet to distribute over the inside wall of the candle the cleaning liquid flowing into the candle interior 8 after opening of the valve. The valve plate 31 of this over-pressure valve which is connected in one piece to the tie rod 33 is forced upwards against this over-pressure valve's valve seat which is constituted by the bottom edge of the hollow screw 35 by the compression spring braced at one end via the washer 38 on the nut 39 which is screwed onto the tie rod 33 and at the other via the support ring 37 on the hollow screw 35, this compression spring so acting as long as the pressure of the cleaning liquid which has flowed into the interior 34 of the hollow screw 35 directly and indirectly via the body of rotation 30 on the valve plate 31 (or to be more exact the pressure difference between this pressure and the pressure in the candle interior 8) is not sufficient to overcome the force of the spring 40. When this threshold value is exceeded, the valve plate 31 is forced downwards and thus exposes between its upper edge and the bottom edge of the hollow screw 35 an annular gap through which the cleaning liquid now flowing into the candle interior 8 is sprayed onto the inside wall of the filter candle 9. Further cleaning liquid then flows through the passage apertures 36 out of the discharge side part 23 of the vessel interior.

The mode of action of the damming means 29 shown in FIG. 2 is in any case exactly the same as described above in connection with the damming means 1 when the pretensioning of the compression spring 40 is adjusted so that the valve plate 31 is pressed downwards more or less at the commencement of the inflow of compressed air from the said container into the discharge side part 23 of the vessel interior (i.e. in other words upon completion of the feed of cleaning liquid from this container) or in the case of the aforesaid alternative method, more or less with the inflow of compressed air from the said container into the discharge section 23 of the vessel interior (i.e. in other words shortly after opening of the said shut-off valve). The pretensioning of the compression spring 40 is in this case relatively small so that the cleaning liquid accumulated in the discharge side part 23 of the vessel interior can flow into the filter candles 9 already with effect from an over-pressure of around 0.01 to 0.1 atmospheres above atmospheric, in the discharge section 23 of the vessel interior compared with the interior 8 of the candles. With higher pretensioning of the spring element which forces the valve plate 31 upwards, the damming means 29 shown in FIG. 2 in conjunction with the said alternative process (storage of compressed air in the said container and of cleaning liquid in the discharge side part 23 of the vessel interior) opens up still further possibilities, one of which is particularly worth mentioning. To explain this possibility, attention should first be drawn to the fact that the said container which in the case of the aforementioned alternative process serves to store the compressed air, ought in principle not to be located in the immediate vicinity of the filter vessel and yet it has been found in practice that if there are considerable distances between this container and the filter vessel, backwash cleaning is frequently not trouble-free. This is attributable to the fact that with considerable distances between the said container and the filter vessel, the pressure in the discharge section 23 of the vessel, at least if the connecting line between the said container and the filter vessel is not of extraordinarily large cross-section, at the commencement of the backwash process, i.e. immediately after opening of the said shut-off valve, does not rise quickly enough because on the one hand the supply of compressed air is impeded by the long length of connecting pipe and on the other the cleaning liquid-as mentioned above - starts to flow out when there is just a slight overpressure in the discharge side part of the vessel interior, so that with this discharge, the volume of air in the discharge side part 23 of the vessel interior increases constantly. The question of the distance between the container and the filter vessel (or to be more accurate the ratio of this distance to the cross-section of the connecting pipe) is interesting only insofar as, in the case of the acceptability of greater distances between the said container and the filter vessel (assuming normal compressed air pipes are used as the connecting line) then as a container filled with compressed air, one might use the pressure receiver (serving as an intermediate store for the compressed air compressor) of the compressed air supply plant, which is in any event needed to operate the filtering plant (and from which the container is normally filled with compressed air, i.e. when the container is a separate container disposed in the immediate vicinity of the filter vessel), which means that the hitherto inevitable separate container located in the immediate vicinity of the filter vessel, becomes unnecessary. The damming means 29 shown in FIG. 2 offers then, with a high pretensioning of the spring element which presses the valve plate 31 upwards firstly and on the one hand an opportunity whereby the air volume remaining in the discharge side part 23 of the vessel interior after storage of the cleaning liquid can be filled with compressed air to a relatively high pressure. The final value of this pressure will be so chosen thereby that it is still with a safety margin below the pressure value which, when exceeded, results in the valve plate 31 being pressed downwards. Then the supply of compressed air to the discharge side part 23 of the vessel interior is initially shut off by a shut-off member located immediately upstream of the filter vessel, until the pressure in the pressure line upstream of the shut-off member has again risen to the pressure in the said pressure receiver of the compressed air supply plant, and upon the subsequent opening of the shut-off member, the pressure in the discharge section 23 of the vessel interior then rises rapidly to above the level of pressure at which the valve plates 31 of the damming means 29 are forced downwards so allowing cleaning liquid to flow into the interiors 8 of the filter candles 9. The high air pressure required at (or shortly after) the commencement of the backwash process in the discharge side part 23 of the vessel interior is in this case undoubtedly provided but the question arises of whether the further supply of compressed air from the pressure line of the compressed air supply plant into the discharge side part 23 of the vessel interior is adequate to maintain the high pressure in the discharge side part 23 of the vessel interior until the sludge is discharged from the filter candles 9, in spite of the rapid increase in air volume due to the outflow of cleaning liquid into the filter candles 9. If this is the case, then it is possible to use as a spring element a compression spring such as the spring 40 in FIG. 2. As a rule, however, this will not be the case and then a spring element such as the compression spring 40 would lead to the backwash process being interrupted as soon as the pressure in the discharge side part 23 of the vessel interior falls below that pressure which causes the valve plate 31 to be forced downwards. In the event of pressure dropping in the discharge section 23 of the vessel interior during the backwash process, therefore, there is in the damming means 29 instead of the compression spring 40 a spring element with a characteristic drop the force-path diagram, in other words one in which the spring force is reduced from a relatively high value to a very low value when the valve plate is depressed. Such a falling characteristic is for example to be found in the end part of the spring travel in spring elements constructed after the fashion of a cross jack, in which the draw-in bolt is replaced by a traction spring, or after the fashion of half such a cross jack. This is also easily understandable, for if the "cross jack" is virtually compressed, the spring force of the traction spring provided in place of the draw-in bolt is for the most part absorbed by the lever arms of the cross jack, while the traction spring, for example when the lever arms are at right-angles to one another, generates a compressive force of the magnitude of its traction capacity at right-angles to the traction spring axis. If, instead of the compression spring 40, there is in the damming means 29 a spring element constructed after the fashion of a cross jack, having a lever arm length a and a traction spring of spring constant c and a length $l_o$ in the unloaded state, then the angle $\alpha$ between the traction spring axis and the individual lever arms when the valve plate 31 is pressed upwards should be ideally so adjusted that $\cos \alpha = \sqrt[3]{l_o/2a}$. With this setting, the result is maximum compressive force of the spring element of magnitude $2ac \cdot \sin^3 \alpha$, which when the spring element is compressed then steadily drops. However, other spring elements with a decreasing force-path characteristic are known which can be used in the damming means 29 instead of the compression spring. In case a candle filter is provided with a damming means such as 29 shown in FIG. 2, in which such spring elements with a decreasing force-path characteristic are provided instead of the compression springs 40, then with suitable dimensioning of the spring elements, it is as a rule possible for the over-pressure valves provided in the damming means (which discharge the cleaning liquid accumulated in the discharge section 23 of the vessel into the filter candles 9 and are controlled by these spring elements,) to be kept open during the entire backwash process until the sludge is rejected by the filter candles 9, solely by the supply of compressed air from the existing compressed air supply plant to the discharge section 23 of the vessel interior using as the container the pressure receiver of the existing compressed air supply plant of the filtration unit and dispensing with a separate container disposed in the immediate vicinity of the candle filter. Generally, it is worth pointing out also that damming means such as in FIG. 1 are suitable for carrying out the backwash cleaning process according to the method described hereinabove in conjunction with FIG. 1 and also for carrying out the method according to the alternatives mentioned in the same connection.

In contrast, the examples of embodiment of damming means which are shown in FIGS. 3 to 5 are in the main suitable for the alternative methods, in which the filter vessel is completely emptied following the end of filtration and then, after discharge of the candle water, the quantity of liquid required for cleaning is stored in the discharge side part 23 of the vessel interior. It is true that the use of these damming means is possible even if the cleaning liquid is not stored in the discharge section 23 of the vessel interior but is stored together with the compressed air in a separate container, but in order to achieve the full dynamic action, then, a relatively difficult management of the process becomes necessary, maintenance of which cannot in practice be presupposed, so that in this case one could only reckon on a relatively low dynamic action being exerted on the part of the damming means.

In the case of the embodiment shown in FIG. 3, the damming means 41 consists of only two components, namely the cylindrical insert 44 provided with a row of cylindrical axially parallel longitudinal bores 42 and having at the top a flange-like collar 43 and which can be fitted into the hollow screw 20 serving to hold the filter candle 9 on the wall plate 20, and the baffle 46 which can be screwed into the threaded bore 45 on the underside of the insert 44. The dynamic action of this damming means 41 is based on the effect linked with the capillarity and the surface tension of liquids, whereby a column of liquid drawn up by an upright suction pipe of sufficiently small diameter is, when air is drawn into the suction pipe, supported by the air beneath it, without air bubbles forming and rising through the column of liquid. This effect is already generally known for instance from pipettes. The maximum tube diameter up to which the column of liquid can be carried by the air below it without air bubbles forming and rising through the liquid can be ascertained experimentally by means of an upright pipe which widens out in a longitudinal direction upwardly and terminating at the top in a measuring cylinder (for example in the form of a hollow cone with a very small cone point angle), the tube being filled with the liquid involved after which air is blown into the tube from the bottom until an air bubble rises in the liquid. From the quantity of liquid which can be read off at the measuring cylinder as having been displaced by blown-in air and taking into account the tube masses, it is then possible to ascertain at which tube diameter this first air bubble formed, and which is the desired maximum tube diameter. If the longitudinally widening out tube used in the test is transparent, then the measuring cylinder can be dispensed with, because then the interface between air and liquid is visible and the desired maximum tube diameter (corresponding to the outside diameter of the tube less twice the wall thickness of the tube at the point where the first air bubble rises) can therefore be measured virtually directly. Experimental findings with a conical glass tube and water as the liquid have shown that this maximum tube diameter, for water as the liquid and glass as the wall material, is in the region of 6 to 10 mm and is therefore relatively large. In the case of metals such as for example stainless steel as a wall material, the maximum tube diameter may even be somewhat higher. Also these results of the aforementioned experimental findings are known generally per se, and in fact it is therefore also known that often the contents of a narrow necked bottle which is help upside down will not flow out, flowing out only when the bottle is held obliquely. Essential to the effect on which the damming or dynamic action of the damming means 41 shown in FIG. 3 is the requirement based is however that the air pressure $p_1$ of the air supporting the column of liquid is higher than air pressure $p_2$ above the column of liquid, and in fact by the magnitude of $\Delta p$ corresponding to the height of the column of liquid, plus the normal pressure $2\delta/r$ of the surface tension of the liquid at the air-liquid interface where the column of liquid is supported by the air and corresponding to the product of the mass of curvature $2/r$ and surface tension $\delta$. The satisfaction of this condition $p_1 = p_2 + \Delta p + 2\delta/r$ is in the case of the damming means 41 achieved in that after the complete emptying of the filter vessel following the completion of filtration and the subsequent pressure equalisation between the feed section 27 and the discharge section 23 of the vessel, leading to discharge of the candle water, a compressed gas or stream of compressed air through the communicating passages 42 of the damming means 41 in the direction from the candle interiors 8 to the discharge section 23 of the vessel interior is generated. (As a rule compressed gas or compressed air is fed to the feed section 27 of the vessel interior and then flows through the sludge cakes and filter candle walls into the candle interiors 8 and thence through the annular gaps 47 and the connecting passages 42 into the discharge section part 23 of the vessel interior and then out through an open outlet valve, possibly because the aforementioned pressure equalization occurs at a level of pressure which is above atmospheric pressure, but possibly also due to the fact that an outlet valve is simply opened on the discharge side of the filter vessel and as a result of the consequently falling pressure in the discharge section 23 of the vessel interior a compressed gas or stream of compressed air is created passing from the feed section 27 of the vessel interior through the communicating passages 42 to the discharge sections 23 of the vessel. Only after commencement of this flow of compressed gas or compressed air through the communicating passages 42 does the supply of the quantity of cleaning water to the discharge section 23 of the vessel interior commence and the flow of compressed gas or compressed air through the communicating passages 42 is maintained until the water building up in the discharge section 23 of the vessel interior has risen to a height of backwater which is a few centimeters below the envisaged final level. The flow of compressed gas or compressed air through the communicating passages 42 ceases as soon as the aforesaid condition concerning pressure ratios is fulfilled and a bubble-shaped upwardly bulging interface of air and liquid having radius of curvature r has formed in each of the mouths of the communicating passsages 42 at their point of discharge into the discharge side part 23 of the vessel interior. Until this point in time, gas or air bubbles rise constantly from the communicating passages 42 in the accumulating water, so preventing water flowing out through the communicating passages 42. With the further rise in the level of accumulated water until the envisaged final level is attained, firstly the gas or air bubbles are compressed at the mouths of the communicating passages 42, the radius of curvature r of the air-liquid interface becoming enlarged, and then the level of these interfaces drops a littlee inside the communicating passages 42. The above-mentioned condition still remains satisfied. In this situation, the water in the discharge side part 23 of the vessel interior can in principle remain stored for any desired length of time without being able to flow out through the communicating passages 42. Naturally, however, when the final level has been reached and the valve provided for the feed of water has closed, with the opening of the shut-off valve between the container containing compressed air stored for backwash cleaning, and the discharge section 23 of the vessel interior, the backwash cleaning process is started. The rest of the pattern of the process is then the same as already described above for the corresponding alternative method in conjunction with the damming means 1. With regard to the dimensioning of the damming means 41, it should also be mentioned that the diameter of the communicating passages 42 in the case of an insert 44 consisting of stainless steel may for example be 3 mm, and that it is advantageous for the upper part of the communicating passages 42 to widen out slightly, for example in a cone or funnel shape, before emptying into the discharge side part 23 of the vessel interior.

Also in the case of the embodiment shown in FIGS. 4 and 5 the dynamic effect of the damming means 48 and 49 is based on the surface tension of the cleaning liquid forming downwardly bulging liquid-air interfaces at the mouths of the communicating passages 50, 51 where they empty into the candle interiors, or on the upwardly directed normal pressure generated by the surface tension of the liquid at these interfaces, and which wholly or at least partially cancels out the pressure generated by the weight of the liquid present above these interfaces. In principle, the condition that the normal pressure of the surface tension of the liquid at the liquid-air interfaces must balance the other pressures in play at these interfaces (the downwardly directed pressure $\Delta p$ corresponding to the height of the liquid above these interfaces or the distance between the surface of the liquid and these interfaces; the likewise downwardly acting air pressure $p_2$ above the liquid and the upwardly acting air pressure $p_1$ at these interfaces) also applies here, but in contrast to the embodiment of FIG. 3, as regards the embodiments according to FIGS. 4 and 5, the condition whereby the air pressure $p_1$ in the candle interior 8 for maintaining the state of equilibrium or to achieve the desired dynamic action needs to be greater than the air pressure $p_2$ in the discharge side part 23 of the vessel interior is not binding, because in the case of the embodiments according to FIGS. 4 and 5, in contrast to that shown in FIG. 3, the liquid-air interfaces are downwardly bulging and correspondingly the normal pressure $p_N$ of the surface tension of the liquid at these interfaces is directed upwardly, so that in the case of the examples of embodiment in FIGS. 4 and 5, the said condition should read $p_1 + p_N = p_2 + \Delta p$ or $p_N = \Delta p - (p_1 - p_2)$, i.e. the normal pressure $p_N$ of the surface tension of the cleaning liquid at the downardly bulging liquid-air interfaces forming at the constrictions 48 and 49, at the points of discharge into the candle interiors, must be equal to the pressure $\Delta p$ corresponding to the height of the liquid above these interfaces and produced by the weight of liquid above these interfaces, less the pressure difference $(p_1 - p_2)$ between the air pressure $p_1$ in the candle interior 8 and the air pressure $p_2$ in the discharge side part 23 of the vessel interior. The pressure difference $(p_1 - p_2)$ can therefore also be nil when $p_N = \Delta p$, i.e. when the said normal pressure $p_N$ is great enough to withstand the pressure of a water column of a height which corresponds to the distance from the candle-interior mouths of the communicating passages 50 or 51 and the surface of the cleaning liquid after the same has accumulated in the discharge side part 23 of the vessel interior. The damming means 48 and 49 are then so designed that a sufficiently high normal pressure $p_N$ results, so that accumulation of the cleaning liquid in the discharge side part 23 of the vessel interior can take place without maintenance of above atmospheric pressure in the candle interiors 8 of the filter candles 9, compared with the discharge section 23 of the vessel interior. For this purpose, in the case of constriction 48, the communicating passages 50 between the discharge section 23 of the vessel interior and the candle interior 8 are a large number of mutually parallel small tubes narrowing conically at the bottom, but having an outside diameter of 0.35 mm, a wall thickness of 0.05 mm and a diameter at the candle-interior mouths of 0.125 mm, and which are fixed in the cylindrical insert 53 having at the top a flange-like collar 52 and which can be pushed into the hollow screw 21 serving to mount the filter candle 9 on the wall plate 20, a connecting material being used to fill the gaps between the tubes. The tubes can be expediently of glass or even metal. The cleaning liquid forms at the mouths towards the candle interiors downwardly bulging interfaces resembling a segment of a sphere and having a radius of curvature r which may be a minimum of approx. 0.085 mm. Thus, when water is used as the cleaning liquid, there is an upwardly directed normal pressure $p_N = 2\delta/r$ of surface tension $\delta$ of the liquid at these interfaces of approx. 170 mm water column, so that the water used as the cleaning liquid can be accumulated up to a height of 10 cm above the upper edge of the insert 53 in the discharge side part 23 of the vessel interior (the length of the tubes is about 7 cm). While the cleaning liquid is accumulating in the discharge side part 23 of the vessel interior, the radius of curvature of the said spherical sector-shaped liquid-air interfaces at the candle-interior mouths of the small tubes becomes increasingly smaller as the height of accumulated cleaning liquid rises, in fact to the extent that the conditions $p_N = \Delta p$ (or in the case of over-pressure in the candle interior 8 $p_N = \Delta p - (p_1 - p_2)$ is always fulfilled. When the above-mentioned maximum height of 10 cm above the top edge of the insert 53, the radius of curvature reaches its minimum of approx. 0.085 mm. If the height of accumulated liquid increases still further, then liquids drops start to become detached from the candle-interior ends of the tubes (which can however be reduced by raising the pressure in the interior 8 of the candle). In the case of the damming means 49, the communicating passages 51 between the discharge section 23 of the vessel interior and the candle interior 8 are formed by a number of parallel straight slots 0.1 mm wide in the cover 54 which can be fitted onto the hollow screw 21. To form the slots, two assemblies of superposed steel plates consisting of stainless steel 0.1 mm thick are used (such as are used for example for razor blades), whereby for each individual slot, two longer small steel plates forming the slot-defining walls and two shorter small steel plates serving as an insert between the slot-defining walls are provided. The shorter steel plates are located at the two ends of and between the longer steel plates. The longer steel plates have on their outer wall around the mouth of the slot as it opens into the candle interior a chamfering extending towards the inner wall, so that the ground face and the inner wall subtend an angle of 30° and the ground edge which is at the point of intersection of the plane of grinding and the plane of the inner wall has a radius of curvature which is below 0.025 mm. In each case 15 to 20 such slot elements consisting each of three layers of small steel plates are superimposed on one another and in this way form one of the said assemblies which is inserted into a window provided for the purpose in the cover 54. The cleaning liquid forms at the candleinterior mouths of these slots downwardly bulging semi-cylindrical shaped interfaces with a radius of curvature r which may be a minimum of approx. 0.075 mm. Thus, when water is used as the cleaning liquid, there is an upwardly directed normal pressure $p_N = \delta/r$ of surface tension $\delta$ of the liquid at these interfaces of approx. 100 mm water column, so that the cleaning water can be stored up to a height of approx. 10 cm above the upper edge of the cover 54, in the discharge section 23 of the vessel interior (the height differential between the upper edge of the cover 54 and the mouths of the slots is negligible). During accumulation of cleaning liquid in the discharge section 23 of the vessel interior, the radius of curvature of the semi-cylindrical shaped liquid-air interfaces at the mouths of the slots as they open into the candle interior becomes ever smaller as the height of accumulated cleaning liquid increases, in fact always to the extent that the conditions $p_N = \Delta p$ (or in the case of over-pressure in the candle interior 8 $p_N = \Delta p - (p_1 - p_2)$ ) is always satisfied. When the above-mentioned maximum height of accumulation of approx. 10 cm above the upper edge of the cover 54 is reached, the radius of curvature reaches its minimum of approx. 0.075 mm. If the height of accumulation is further increased, then the cleaning liquid starts to flow through the slots (which can however be prevented by increasing the pressure in the candle interior 8 before the maximum height of accumulated liquid is reached). With regard to the construction of the damming means 48 and 49 shown in FIGS. 4 and 5, it should be noted that in both forms, in order to disperse the cleaning liquid which during the backwash process flows through the small tubes or slots into the candle interior 8, over the inside wall of the candles, a baffle plate 55 is provided which is suspended on a supporting bar fixed to the damming means. In the case of the damming means 48, the supporting bar is located in the center of the bundle of tubes and is fixed by means of the aforesaid connecting material which fills in the gaps between the tubes. In the case of the damming means 49, the supporting bar is fixed to a web which separates from each other the two windows in the cover 54 which are provided for the said two assemblies. In the case of the above-described development, the damming means 48 and 49 shown in FIGS. 4 and 5 have more or less the same height available for accumulated liquid as the damming means 1 shown in FIG. 1. Therefore, they would function in exactly the same way as damming means 1, if they were to be provided with an additional pressure equalizing tube communicating with the candle interior 8 with a inside diameter corresponding to the diameter of the hole 28 in the damming means 1 and which, in the discharge section 23 of the vessel interior, projects beyond the maximum height of accumulated cleaning liquid. Such a pressure equalizing tube might for example be formed by a supporting bar of the baffle plate 55 which is constructed as a tube and extends upwards to above the maximum height to which cleaning liquid can be accumulated. With such a pressure equalizing tube, the damming means 48 and 49 could be used for all forms of the backwash cleaning process described hereinabove in conjunction with the damming means 1, the pattern of the backwash cleaning process being the same as described above in conjunction with FIG. 1. However, a disadvantage of such a pressure equalizing tube would be the danger of damage which always arises when there are relatively thin parts projecting for some distance, and therefore, in the case of the damming means 48 and 49, no such pressure equalizing tube is provided. Without the pressure equalizing tube, as already mentioned, the damming means 48 and 49 are in the main only suitable for the alternative processes in which the filter vessel after the end of filtration, is completely emptied and then, after the candle water has flowed out, the quantity of liquid needed for cleaning is stored in the discharge section 23 of the vessel interior. The pattern of the backwash cleaning process is however still the same as described above for the corresponding alternative process in conjunction with FIG. 1. In conclusion, with regard to the dimensioning of the main component parts of the damming means 48 and 49, in other words the small tubes or slots, as indicated by way of example hereinabove, the following should be noted: if one forgoes the requirement that the height available for accumulating liquid in the damming means 48 or 49 is, for equal air pressure in the candle interior 8 as in the discharge side part 23 of the vessel interior, greater than or at least equal to the envisaged height to which cleaning liquid can be accumulated in the discharge section 23 of the vessel interior, and if an over-pressure is allowed in the candle interior 8 in comparison with the pressure in the discharge section 23 of the vessel interior, then in the case of the damming means 48, the tubes may have a substantially larger diameter or alternatively the slots in the damming means 49 may be substantially wider. For example, in the case of tubes with an outside diameter of 0.7 mm, a wall thickness of 0.1 mm and a diameter of the candle interior mouths of 0.27 mm or in the case of slots with a width of 0.75 mm, a height of 15 mm above the upper edge of the insert 53 or cover 54 can result and the increase in pressure in the interior 8 of the candle can readily be brought to 100 mm above this upper edge. One must then only, during accumulation of the cleaning liquid, gradually increase the air pressure in the candle interior 8 by feeding compressed air to the feed side part 27 of the vessel interior and commence this increase when the level of cleaning liquid, rising during accumulation, reaches the area between the upper edge of the insert 53 or cover 54 and the height of accumulated liquid permissible above this edge which arises without any over-pressure in the candle interior 8. The surface of the liquid must thereby already be above this upper edge to ensure that no pressure equalization takes place between the candle interior 8 and the discharge section 23 of the vessel interior, and it must still be below the accumulation height arising without over-pressure in the candle interior 8, because the cleaning liquid would otherwise run out into the candle interior. The key to the timing of the increase in air pressure in the candle interiors 8 of the filter candles 9 and thus therefore for the adjustment of compressed air supply to the feed section 27 of the vessel interior is the above-mentioned condition of equilibrium $p_N = \Delta p - (p_1 - p_2)$. Accordingly, the compressed air supply must be so adjusted that the pressure difference $(p_1 - p_2)$ between the air pressure $p_1$ in the interior 8 of the candle and the air pressure $p_2$ in the discharge side part of the vessel interior rise to about the same extent as the pressure of the water column above the mouths of the tubes or slots facing towards the candle interior. In this way, the height to which cleaning liquid can accumulate in the discharge side part 23 of the vessel interior can be increased to any desired degree.

I claim:

1. In a candle filter filtration unit comprising a filter vessel, a wall plate disposed in said vessel and separating the same into a lower feedsection and an upper discharge section of the vessel interior, a plurality of filter candles each suspended at their upper ends from said wall plate and opening into said upper discharge section and means for supplying cleaning liquid under pressure to said discharge section for passage into said filter candles to remove sediment deposited on said filter candles, in combination, the improvement comprising a plurality of similar damming means, one communicating with the upper end of each such filter candle, for temporarily preventing flow of said cleaning fluid supplied to said upper section into any upper candle end until the level of such fluid accumulated in said upper section is sufficient to provide flow into such candle ends generally simultaneously and then permitting the passage of such fluid into the candle ends in amounts sufficient to remove said deposited sediment from all of said candles.

2. A filtration unit according to claim 1, wherein said damming means comprises a feed aperture (24) for feeding accumulated liquid into the upper end of each candle, a discharge orifice (22) communicating with the interior (8) of the associated filter candle (9) and a communicating passage (25, 6, 13) extending between said feed aperture and discharge orifice via an overflow point (26) disposed above the mouth of the feed aperture (24).

3. A filtering plant according to claim 2, wherein the accumulating means (1) comprises two concentric vertically disposed tubes (2, 3) of which the outer tube (2) is open at its bottom end for admitting liquid therein and communicates adjacent at its upper end with apertures (6) formed in the inner tube at a point spaced above said plate, said inner tube at its bottom end communicating with the candle interior (8).

4. A filtering plant according to claim 3, including a cap (4) at the upper end of said outer tube and to avoid a siphoning effect said cap (4) is provided with a hole (28), the cross-section of which is less than 10% of the cross-section of the opening in the inner tube (3).

5. A filtering plant according to claim 3, wherein the apertures (6) in the inner tube (3) are U-shaped slots, the arms of the U-shape extending peripherally of the tube (3) and the sides of said slots project tongue-like inwardly towards the interior (13) of the tube to act as baffles for a liquid flowing through the apertures into the tube interior.

6. A filtering plant according to claim 1, wherein said damming means is located in the path of flow from the upper section of the vessel to the interior (8) of the associated filter candle comprises means (29, 41, 48, 49) for allowing passage of liquid in the direction of flow from the upper section of the vessel to the candle interior only after a specific threshold value of pressure difference between the pressure in the upper section of the vessel interior and the pressure in the candle interior while allowing flow in the opposite direction when there is an over-pressure in the candle interior in comparison with the upper section of the vessel.

7. A filtering plant according to claim 6, wherein said damming means comprises two anti-parallel connected over-pressure valves (31, 35, 37, 38, 39, 40; 30, 31) of which one (31, 35, 37, 38, 39, 40) permits throughflow in the direction of flow from the upper section of the vessel to the candle interior after the achievement of said predetermined pressure difference between said upper section and candle interior, and the other (30, 31) serves to allow passage in the opposite direction of flow.

8. A filtering plant according to claim 6, wherein said damming means (41) comprises at least one communicating passage (42) located in the path of flow from the upper section (23) of the vessel to the candle interior (8) and having its inside width so dimensioned that the capillarity of the communicating passage excludes any possibility of air bubbles forming and rising in a column of liquid in the communicating passage, and a column of liquid can therefore be supported in the communicating passage by the air located beneath it.

9. A filtering plant according to claim 8, wherein a plurality of said communicating passages (42) are provided, which terminates at the same height and are connected in parallel in terms of flow.

10. A filtering plant according to claim 6, wherein said accumulating means (48, 49) comprises a plurality of communicating passages (50, 51) located in the path of flow from the upper section (23) of the vessel to the candle interior (8), located at the same height and connected in parallel with regard to flow, said communicating passages having at least approximately the same inside diameter in the region of their mouths opening toward the candle interior, said mouths being so constructed and their inside widths being so dimensioned in the region of these mouths that the mass of curvature of liquid-air interfaces which form at these mouths can alone or in conjunction with a pressure differential between the pressure in the candle interior and the pressure in the upper section of the vessel exclude any possibility of liquid drops becoming detached from these mouths.

11. A filtering plant according to claim 10, wherein said communicating passages (51) are slot or gap-shaped and at least in the region of their mouths opening towards the candle interior, have an inside clearance of less then 2 mm.

12. A filtering plant according to claim 10, wherein the communicating passages (50) have at least in the region of their mouths opening towards the candle interiors, a circular cross-section having a diameter of less than 4 mm.

13. A filtering plant according to claim 10, wherein the walls defining the communicating passages (50, 51) have at the mouths which discharge into the candle interior sharp-edged rims with an angle of between 0° and 60° between inside and outside faces of the wall and a radius of curvature of less than 0.1 mm.

14. The filtration unit of claim 1 wherein said damming means is effective to prevent such flow until the pressure in said upper section exceeds the pressure in said lower section by a predetermined extent.

* * * * *